US009330297B2

(12) United States Patent  
Xu et al.

(10) Patent No.: US 9,330,297 B2  
(45) Date of Patent: May 3, 2016

(54) METHODS AND SYSTEMS FOR VIDEO-BASED CHEW COUNTING VIA FEATURE TRACKING

(71) Applicant: Xerox Corporation, Norwalk, CT (US)

(72) Inventors: Beilei Xu, Penfield, NY (US); Robert P. Loce, Webster, NY (US); Graham Pennington, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 79 days.

(21) Appl. No.: 13/742,658

(22) Filed: Jan. 16, 2013

(65) Prior Publication Data

US 2014/0198947 A1    Jul. 17, 2014

(51) Int. Cl.
G06K 9/00          (2006.01)

(52) U.S. Cl.
CPC ................................. G06K 9/00261 (2013.01)

(58) Field of Classification Search
CPC ................................................. G06K 9/00335
USPC .................. 382/103, 107, 106, 118, 171, 182
See application file for complete search history.

(56) References Cited

U.S. PATENT DOCUMENTS

| 5,340,309 A * | 8/1994 | Robertson | 433/69 |
| 5,795,306 A * | 8/1998 | Shimotani et al. | 600/558 |
| 2006/0064037 A1 * | 3/2006 | Shalon | A61B 5/0006 600/586 |
| 2011/0007174 A1 * | 1/2011 | Bacivarov et al. | 348/222.1 |
| 2011/0184247 A1 * | 7/2011 | Contant et al. | 600/300 |
| 2012/0321134 A1 * | 12/2012 | Shen et al. | 382/103 |

OTHER PUBLICATIONS

E. M. Wilson and J. R. Green, "The development of jaw motion for mastication," Early Human Development, vol. 85, No. 5, pp. 303-311, May 2009.*

Mark Schmalz et al., "Dietary Monitoring for Diabetes & Obesity: Early Algorithm for Detection and Quantification of Chewing Behavior", Technical Report MPCL-08-08, pp. 1-20. May 2008.*

Mahmoud M, Kaliouby RE, Goneid A: "Towards communicative face occlusions: machine detection of hand-over-face gestures". ICIAR. 2009, 481-490.*

Donna G. Gaul et al., "Relationship between eating rates and obesity", Journal of Consulting and Clinical Psychology, vol. 43(2), Apr. 1975, pp. 123-125.

Brian Wansink et al., "Eating Behavior and Obesity at Chinese Buffets", Obesity, Short Communications, Behavior and Phsycology, advanced online publication Jun. 5, 2008, pp. 1-4, www.obesityjournal.org.

Mark Schmalz et al., "Dietary Monitoring for Diabetes & Obesity: Detection and Quantification of Chewing Behavior—Backgroung and Phenomenology", Technical Report MPCL-08-07, pp. 1-35.

O. Amft et al., "Analysis of chewing sounds for dietary monitoring", Proc. 7th Intl. Conf. on Ubiquitous Computing (Tokyo), 2005, pp. 1-16.

(Continued)

*Primary Examiner* — Bhavesh Mehta  
*Assistant Examiner* — Ian Lemieux  
(74) *Attorney, Agent, or Firm* — MH2 Technology Law Group LLP (57) ABSTRACT

A system and method of video-based chew counting by receiving image frames from a video camera, determining feature points within the image frames from the video camera, generating a motion signal based on movement of the feature points across the image frames from the video camera, and determining a chew count based on the motion signal.

18 Claims, 6 Drawing Sheets

(56) References Cited

OTHER PUBLICATIONS

Edward Sazonov et al., "Non-invasive monitoring of chewing and swallowing for objective quantification of ingestive behavior", Physiological Measurement, May 2008, 29(5), pp. 1-23.

CJ Boushey et al., "Use of technology in children's dietary assessment", European Journal of Clinical Nutrition, Feb. 2009, 63(Suppl 1), pp. 1-15.

Fengqing Zhu et al., "The Use of Mobile Devices in Aiding Dietary Assessment and Evaluation", IEEE Journal of Selected Topics in Signal Processing, vol. 4, No. 4, Aug. 2010, pp. 756-766.

Bethany L. Six, RD, et al., "Evidence-Based Development of a Mobile Telephone Food Record", Journal of the American Dietetic Association, Jan. 2010, 110(1), pp. 1-10.

Anand Mariappan et al., "Personal Dietary Assessment Using Mobile Devices", SPIE-IS&T, vol. 7246 72460Z-12, 2009, pp. 1-12.

\* cited by examiner

METHODS AND SYSTEMS FOR VIDEO-BASED CHEW COUNTING VIA FEATURE TRACKING

TECHNICAL FIELD

The present disclosure relates generally to methods, systems, and computer readable media for extracting chew counts from moving image media by identifying and tracking features on a face.

BACKGROUND

It is widely known and accepted that thoroughly chewing food, i.e. high chew counts, can have a number of positive health benefits. For example, high chew counts can aid in digestion, and people that thoroughly chew their food tend to eat in smaller portions than people that do not. Accordingly, individuals, health insurance companies, and government agencies have interest in tools, in particular low cost tools that can monitor chew counts to help people maintain healthy eating habits.

Current tools can analyze a captured video of a subject chewing and count the number of chews by segmenting a portion of the subject's frontal face and performing a frequency analysis. However, such complex methods are particularly sensitive to different views of the head and noise, particularly when using low quality video due to the quasiperiodic or aperiodic nature of chewing motions. Accordingly, frequency analyses by segmenting portions of a subject's face can yield inaccurate results.

Therefore, there is a need for a simplified chew-counting tool that can use low-cost technologies, such as a standard video camera, and effectively and accurately extract a chew count from a video.

SUMMARY OF THE INVENTION

The present disclosure relates generally to methods, systems, and computer readable media for providing these and other improvements to video-based chew counting.

In some embodiments, a computing device can receive a video of au eating session. For example, the video can include a front view of a subject eating.

The computing device can detect and track image processing feature points within the video. The computing device can generate a motion signal from the tracked image processing feature points that, for example, have occurrences of high separation from other image processing feature points or have stronger, nonuniform, and or aperiodic motion compared to other tracked image processing feature points.

Finally, a chew count can be extracted from the motion signal. For example, the number of peaks or troughs in the motion signal can be counted for the duration of the video, where each peak or trough represents a chew count.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1A:
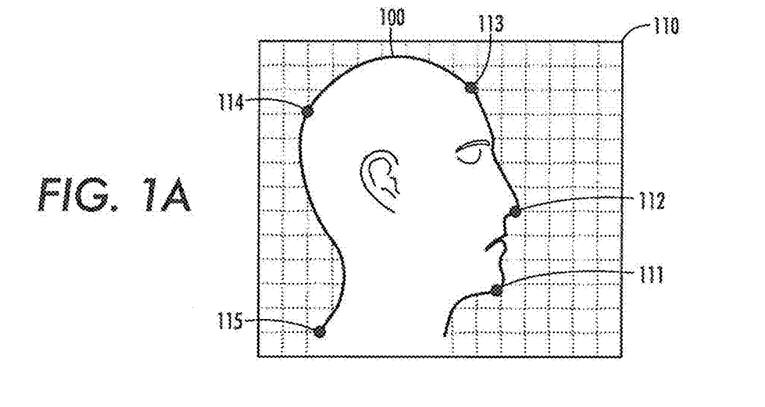
FIG. 1A is a diagram depicting an exemplary image from a first frame of a video and grid locations of detected image processing feature points within the exemplary image, consistent with certain disclosed embodiments.

FIG. 1A is a diagram depicting an exemplary image from a first frame of a video and grid locations of detected image processing feature points within the exemplary image, consistent with certain disclosed embodiments. As depicted in FIG. 1A, image frame 110 represents a still image frame of a video at a first time (e.g. 0.0 seconds into the video) depicting a background grid and a profile view of a head 100 of a subject that is chewing food. The background grid is shown in image frame 110 is merely for the purpose of illustration, and, in embodiments, image frame 110 may not include a background grid.

From image frame 110 and/or other image frames from the video, a computing device can detect salient features on head 100 and identify and track the salient features as image processing feature points (hereinafter, "feature points"). For example, the computing device can use Scale-invariant feature transform (SIFT) or Speeded Up Robust Feature (SURF) methods to detect the feature points. In other embodiments, the computing device can use additional feature detection methods such as, but not limited to, edge detection, corner detection (e.g. Harris Corners), Gradient Location and Orientation Histogram (GLOH), and Histogram of Oriented Gradients (HOG).

As an example, the computing device could identify points 111 (feature point 1), 112 (feature point 2), 113 (feature point 3), 114 (feature point 4), and 115 (feature point 5) from image frame 110 as feature points in the video. As depicted in FIG. 1A in image frame 110, point 111 can be at location (9.8, 2.8), point 112 can be at location (10.6, 6), point 113 can be at location (8.7, 11), point 114 can be at location (2, 10), and point 115 can be a location (2.5, 1).

Figure 1B:
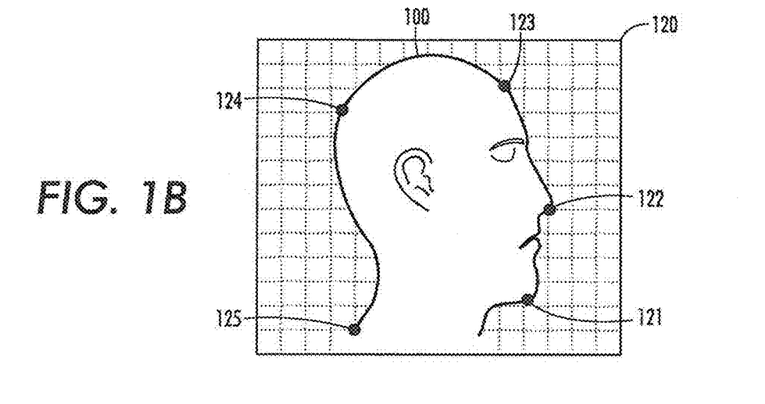
FIG. 1B is a diagram depicting an exemplary image from a second frame of the video and grid locations of detected image processing feature points within the exemplary image, consistent with certain disclosed embodiments.

FIG. 1B is a diagram depicting an exemplary image from a second frame of the video and grid locations of detected image processing feature points within the exemplary image, consistent with certain disclosed embodiments. As depicted in FIG. 1B, image frame 120 represents a still image frame of the video at a second time (e.g. 0.5 seconds into the video) depicting a background grid and a profile view of a head 100 of the subject that is chewing food. The background grid is shown in image frame 120 is merely for the purpose of illustration, and, in embodiments, image frame 120 may not include a background grid.

Utilizing the feature points identified in image frame 110, the computing device can identify the position of the same feature pouts in image frame 120. As an example, the computing device could identify points 121 (feature point 1), 122 (feature point 2), 123 (feature point 3), 124 (feature point 4), and 125 (feature point 5) from image frame 120 as feature points in the video corresponding to points 111, 112, 113, 114, and 115 in image frame 110, respectively. As depicted in FIG. 113 in image frame 120, point 121 can be at location (11, 2.2), point 122 can be at location (12, 6), point 123 can be at location (10.1, 11), point 124 can be at location (3.4, 10), and point 125 can be a location (3.9, 1).

Notably, feature points 2-5 moved horizontally 1.4 units and 0 units vertically from image frame 110 to image frame 120. Additionally, feature point 1 move horizontally 1.2 units and vertically −0.6 units from image frame 110 to image frame 120.

Figure 1C:
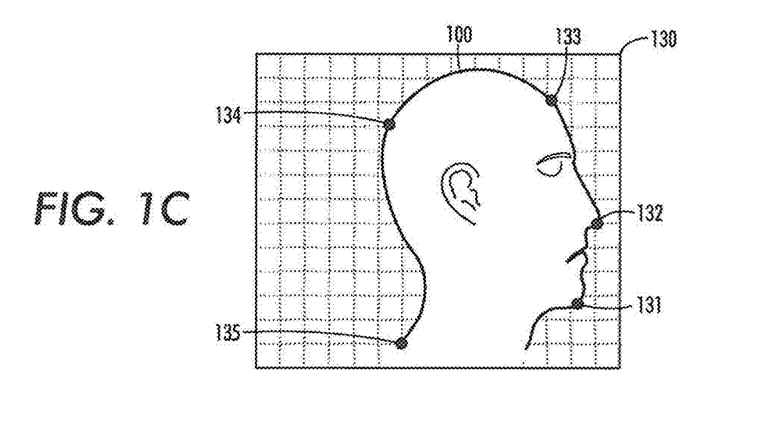
FIG. 1C is diagram depicting an exemplary image from a third frame of the video and grid locations of detected image processing feature points within the exemplary image, consistent with certain disclosed embodiments.

FIG. 1C is a diagram depicting an exemplary image from a third frame of the video and grid locations of detected image processing feature points within the exemplary image, consistent with certain disclosed embodiments. As depicted in FIG. IC, image frame 130 represents a still image frame of the video at a third time (e.g. 1.0 seconds into the video) depicting a background grid and a profile view of a head 100 of the subject that is chewing food. The background grid is shown in image frame 130 is merely for the purpose of illustration, and, in embodiments, image frame 130 may not include a background grid Utilizing the feature points identified in image frame 110, the computing device can identify the position of the same feature points in image frame 130. As an example, the computing device could identify points 131 (feature point 1), 132 (feature point 2), 133 (feature point 3), 134 (feature point 4), and 135 (feature point 5) from image frame 130 as feature points in the video corresponding to points 111, 112, 113, 114, and 115 in image frame 110 and points 121, 122, 123, 124, and 125 in image frame 120, respectively. As depicted in FIG. 1C in image frame 130, point 131 can be at location (13.2, 2.7), point 132 can be at location (14, 6), point 123 can be at location 12.1, 11), point 124 can be at location (5.4, 10), and point 125 can be a location (5.9, 1).

Notably, feature points 2-5 moved horizontally 2 units and 0 units vertically from image frame 120 to image frame 130. Additionally, feature point 1 move horizontally 2.2 units and vertically 0.5 units from image frame 120 to image frame 130.

Based on the locations of the feature points across the image frames, the computing device can determine that head 100 is moving to the right from image frame 110 to image frame 130 and/or adjust the location of the feature points to account for this movement. Further, the computing device can determine that feature point 1 (111, 121, and 131) has an occurrence of high separation from the other feature points and/or that feature point 1 (111, 121, and 131) is moving in a vertical motion even when the image frames are adjusted to neutralize the rightward movement of the head across the image frames. Accordingly, feature point 1 (111, 121, and 131) could represent a jaw line, and the vertical motion/high separation can represent a chewing motion. Based on one or more of the above determinations, the computing device can select feature point 1 (111, 121, and 131) to generate a motion signal and can extract a chew count from the motion signal.

The above example represents a simplified example of the process of identifying feature points and, in particular, feature points that can be selected to generate motion signals and extract chew counts. In embodiments, a much larger number of feature points can be identified and tracked on head 100. Additionally, the computing device can analyze the locations of the feature points with an algorithm such as, but not limited to, Random Sample Consensus (RANSAC) to identify feature points that are outliers based on their motion across the image frames. Feature points that are identified as outliers based on their motion can be used to generate motion signals and to extract chew counts.

Additionally, although the above example depicts captured image frames of a profile view of a head, the described methods can be used with various different views of a head. In various embodiments, a chew count can be extracted using any view or partial view of a head where chewing motions are visible. For example, a front view of a head can be utilized. Additionally, in further embodiments, multiple heads from the same image frame and/or the same video can be analyzed and multiple chew counts can be extracted.

Figure 1D:
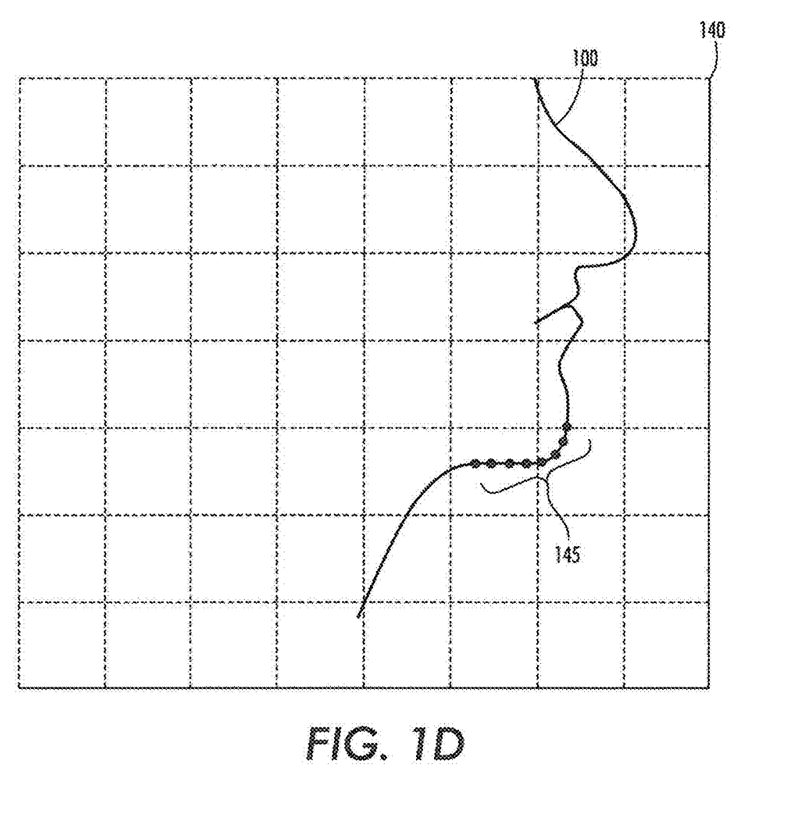
FIG. 1D is diagram depicting an exemplary image from the video and grid locations of image processing feature points that can be used to generate a motion signal and extract a chew count, consistent with certain disclosed embodiments.

FIG. 1D is diagram depicting an exemplary image from the video and grid locations image processing feature points that can be used to generate a motion signal and extract a chew count, consistent with certain disclosed embodiments. As depicted in FIG. 1D, image frame 140 represents a still image frame of the video depicting a background grid and a profile view of part of head 100 of the subject that is chewing food. The background grid is shown in image frame 140 merely for the purpose of illustration, and, in embodiments, image frame 140 may not include a background grid.

Image frame 140 can represent a magnified view of image frame 130, and feature points 145 represent the feature points identified as, for example, having an occurrence of high separation from other feature points. Subsequently, motion of feature points 145 can be tracked and analyzed to determine a chew count for the subject.

Figure 2A:
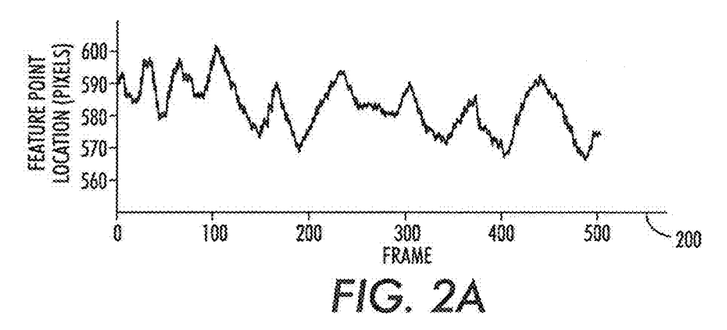
FIG. 2A is a diagram depicting a raw result of a motion signal of a tracked image processing feature point, consistent with certain disclosed embodiments.

FIG. 2A is a diagram depicting a raw result of a motion signal of a tracked image processing feature point, consistent with certain disclosed embodiments. As depicted in FIG. 2A, a y-axis of graph 200 can represent feature point location. In embodiments, they-axis of graph 200 can represent isolated vertical motion of feature points selected by the computing device based on, for example, occurrences of high separation from other feature points. As an example, the isolated vertical position of the feature points can be measured in pixels. In certain implementations, the raw data depicted in graph 200 can represent the relative motion of a representative feature point. In further implementations, the raw data depicted in graph 200 can represent an average location of multiple selected feature points.

Additionally, as further depicted in FIG. 2A, an x-axis of graph 200 can represent passage of time, such as, for example, a frame number of each image frame from a video of a subject chewing.

Figure 2B:
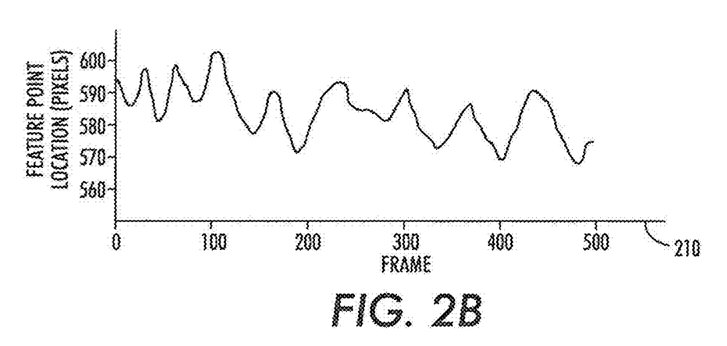
FIG. 2B is a diagram depicting a smoothed and/or detrended motion signal of the tracked image processing feature point, consistent with certain disclosed embodiments.

FIG. 2B is a diagram depicting a smoothed and/or detrended motion signal of the tracked image processing feature point, consistent with certain disclosed embodiments. As depicted in FIG. 2B, a y-axis of graph 210 can represent feature point location based on tracked feature point(s), and an x-axis of graph 210 can represent passage of time, such as, for example, a frame number of each image frame from the video of the subject chewing.

In embodiments, the motion signal depicted in graph 210 can represent a smoothed and/or detrended version of the motion signal depicted in graph 200. For example, the raw data from the tracked feature point(s) can be filtered using a bandpass filter to isolate and/or smooth the detected motion of the feature point. Additionally or alternatively, the raw data depicted in graph 200 can be detrended to isolate short-term changes and ignore long-term changes.

Figure 2C:
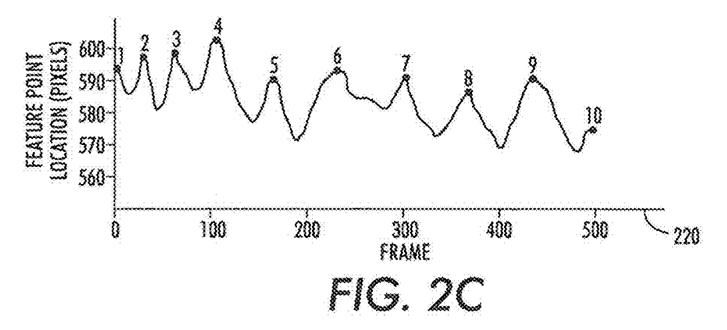
FIG. 2C is a diagram depicting counted peaks from the smoothed and/or detrended motion signal, consistent with certain disclosed embodiments.

FIG. 2C is a diagram depicting counted peaks from the smoothed and/or detrended motion signal. As depicted in FIG. 2B, a y-axis of graph 220 can represent feature point location based on tracked feature point(s), and an x-axis of graph 220 can represent passage of time, such as, for example, a frame number of each image frame from the video of the subject chewing.

In embodiments, the motion signal depicted in graph 220 can represent the smoothed and/or detrended motion signal depicted in graph 210. Additionally, as illustrated in graph 220, the peaks of the motion signal can be counted. Each peak can represent a single chew, and graph 220 may contain ten peaks. Accordingly, graph 220 can show that the subject in the video chewed the food ten times between frame 0 and frame 500. Alternatively or additionally, in further embodiments, the troughs of the motion signal can be counted.

As used herein, graphs 200, 210, and 220 are for the purpose of illustration, and are not intended to depict an actual step in extracting chew counts from a video. A computing device need not actually generate a visible graph, but, in embodiments, may only analyze the raw data as numerical data and smooth and/or detrend the numerical data and determine peaks and/or troughs based on the smoothed and/or detrended numerical data.

In some embodiments, different units of measure may be used to indicate the movement of the feature point(s). For example, image measurements are not limited to a pixel unit, and a pixel, as used herein, can represent a fraction of a pixel or multiple pixels. Further, in certain implementations, actual measurements of the scene captured in the video may be determined and utilized. For example, a computing device could determine or estimate actual measurements based on estimated sizes of facial features and/or reference images captured in the video. Accordingly, a motion signal could be measured in, for example, inches or millimeters.

In further implementations, the time represented on the x-axis of graphs 200, 210, and 220 can be in seconds, fractions of a second, or any other unit of time.

FIGS. 2A-2C depict a simplified example of a motion signal based on one or more feature points. The different location values and frame numbers illustrated in graphs 200, 210, and 220 are for the purposes of illustration and are not intended to be limiting. Further, the location values and frame numbers are not intended to depict actual values that may be extracted using the disclosed techniques, but are simplified values for the purpose of illustration.

Figure 3:
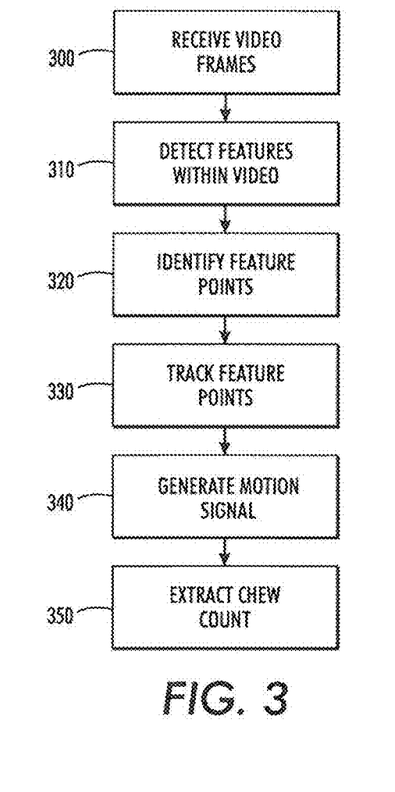
FIG. 3 is a flow diagram illustrating an exemplary method of extracting chew counts from a video, consistent with certain disclosed embodiments.

FIG. 3 is a flow diagram illustrating an exemplary method of extracting a chew count from a video, consistent with certain disclosed embodiments. The process can begin in 300, when a computing device receives one or more image frames from a video. For example, the computing device can receive the image frames from an attached video camera, while the attached video camera is concurrently recording the video. In embodiments, the image frames can depict a view of a subject chewing food. The views of the subject can include, but are not limited to, side views and front views.

In certain implementations, the computing device can detect the subject's face within the image frames. For example, the computing device can use detection methods that include: Viola-Jones object detection; Schneiderman and Kanade face detection; Rowley, Baluja, and Kanade face detection; etc. However, in alternatively embodiments, the computing device may not perform a separate step of detecting the subject's face within the image frames, and may perform the below method steps on the entire image frame. Accordingly, hereinafter, reference to the subject's face can additionally, in some embodiments, refer to the entire image frame.

In 310, the computing device can detect salient features within the subject's face and identify some or all of the salient features as feature points. For example, the computing device can use SIFT and/or SURF methods to identify the feature points. In other embodiments, the computing device can use additional feature detection methods such as, but not limited to, edge detection, corner detection (e.g. Harris Corners), GLOH, and HOG.

In 320, the computing device can identify feature points that have occurrences of high separation from other feature points or have stronger, non-uniform, periodic, quasiperiodic, and/or aperiodic motion compared to other feature points by analyzing the movement of the feature points. For example, the computing device can use an algorithm such as, but not limited to, RANSAC to identify feature points that are outliers based on their motion across the image frames. Head motion and/or camera motion can be separated from chewing motion due to the periodic, quasiperiodic aperiodic and/or irregular motion of, for example, a jaw line of a subject that is chewing. Accordingly, feature points that are identified as outliers based on their motion can be identified and isolated.

In some embodiments, the feature points identified and isolated in 320 can be further smoothed using curve fitting and based on known shapes, such as, for example, jaw line shapes. In embodiments, tape selected feature points can be fit to a curve using, methods that include, but are not limited to, the Levenberg-Marquardt algorithm and nonlinear regression. In further embodiments, a separate step of fitting the selected feature point to a curve nay not be performed.

In 330, the computing device can track the selected feature points. For example, the computing device can record the pixel locations of one or more feature points relative to the rest of the subject's face. Accordingly, head motion and/or camera motion can be accounted for and negated when tracking the pixel locations. In some embodiments, a representative feature point may be tracked, while, in further embodiments, multiple feature points may be tracked and average location information of the feature points tray be used.

In further embodiments, image measurements are not limited to a pixel unit and location data can be recorded in fractions of a pixel or as blocks of multiple pixels. Further, in certain implementations, actual measurements of the scene captured in the video may be determined or estimated and utilized. For example, a computing device could determine or estimate actual measurements based on estimated sizes of facial features and/or reference images captured in the video. Accordingly, feature point-locations could be measured in, for example, inches or millimeters.

In 340, the computing device can generate a motion signal. A motion signal can represent tracked data for one or more feature points. In some embodiments, a filtered motion signal can created by applying a smoothing algorithm and/or detrending algorithm to the motion signal to isolate and simplify the motion of the feature points.

In 350, the computing device can extract a chew count from the motion signal and/or the filtered motion signal. For example, the peaks of the filtered motion signal can be counted, where each peak represents a single chew. In further embodiments other methods of counting chews can be used. For example, the troughs of the filtered motion signal, the transitions between peaks and troughs of the filtered motion signal, or each time the filtered motion signal passes an established threshold can be counted as a chew.

The extracted chew count used as raw data, or, in embodiments, can be further used to compute various eating metrics, such as, but not limited to, chews per unit of time, chews per swallow, and chews per intake event (e.g. chews per spoonful, chews per bite, etc.). For example, the computing device can detect a swallow by isolating and generating motion signals for feature points with horizontal motion compared to other feature points, and can combine the number of swallows with the extracted chew count. Additionally or alternatively, the computing device can recognize an intake event by detecting occlusion of one or more feature points, which can be caused by a hand or an eating utensil, and combine the number of intake events with the extracted chew count. Further, the computing device can track the amount of time that passes between chews or for a period of chews.

While the steps depicted in FIG. 3 have been described as performed in a particular order, the order described is merely exemplary, and various different sequences of steps can be performed, consistent with certain disclosed embodiments. Further, the steps described are not intended to be an exhaustive or absolute, and various steps can be inserted or removed. For example, in some embodiments, all feature points may be tracked, and feature points showing chewing motions can be identified from the raw data. Additional variations of steps can be utilized, consistent with certain disclosed embodiments.

Additionally, although the described steps describe a process for extracting a chew count from a single subject, the disclosed method is not so limited, in some embodiments, multiple subjects can be captured in the video, simultaneously and/or sequentially, and the computing device can separately track feature points for each subject or one or more selected subjects and extract a chew count for each subject.

In even further embodiments, the computing device could track feature points and extract chew counts from multiple cameras capturing subject(s) chewing food from multiple angles. For example, the computing device could extract a chew count from each video separately and compare/combine the results for a more accurately chew count. Alternatively or additionally, the computing device can combine the data from the individual cameras at any point in the above described steps to increase the accuracy of the chew count.

Figure 4:
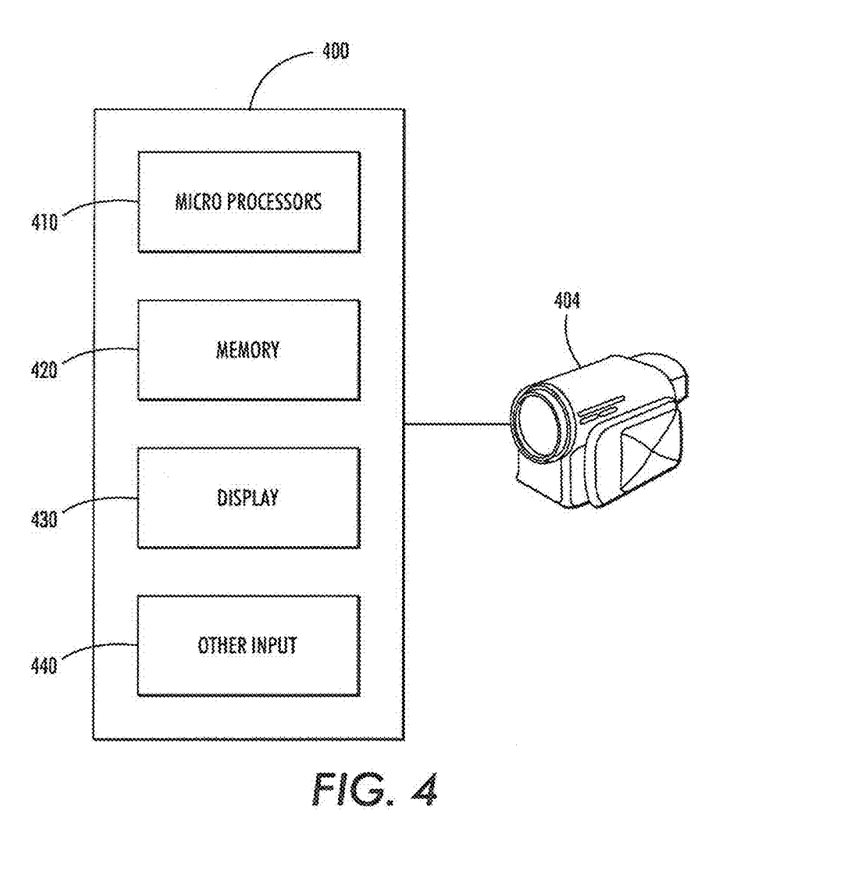
FIG. 4 is a diagram depicting an exemplary computing device that may utilize chew counting technologies, consistent with certain disclosed embodiments.

FIG. 4 is a diagram depicting an exemplary computing device that may utilize chew counting technologies, consistent with certain disclosed embodiments. Computing device 400 may represent any type of one or more computing devices able to receive input from video camera 404. For example, computing device 400 may represent a personal computer, a cellular phone, a tablet computer, or a laptop. Additionally, in some embodiments, video camera 404 can be integrated with computing device 400.

Video camera 404 can represent any type of image capturing device capable of sending a sequence of captured images to computing device 400. In embodiments, video camera 404 can represent a specialized or high quality camera, such as, for example, a high-definition camera. In further embodiments, video camera 404 can represent standard and/or non-specialized cameras and/or cameras integrated into devices such as cellular phones, tablet computers, laptops, etc.

Computing device 400 may include, for example, one or more microprocessors 410 of varying core configurations and clock frequencies; one or more memory devices or computer-readable media 420 of varying physical dimensions and storage capacities, such as flash drives, hard drives, random access memory, etc., for storing data, such as images, files, and program instructions for execution by one or more microprocessors 410; one or more transmitters for communicating over network protocols, such as Ethernet, code divisional multiple access (CDMA), time division multiple access (TDMA), etc. Components 410 and 420 may be part of a single device as disclosed in FIG. 4 or may be contained within multiple devices. Those skilled in the art will appreciate that the above-described componentry is exemplary only, as device 400 may comprise any type of hardware componentry, including any necessary accompanying firmware or software, for performing the disclosed embodiments.

Furthermore, computing device 400 can, in embodiments, include a display 430 as an integrated or non-integrated component. Computing device 400 can additionally include other input devices 440 that are integrated with the device or capable of sending information to the device. Such input devices can include, but are not limited to, a mouse, a keyboard, and a microphone.

Figure 5:
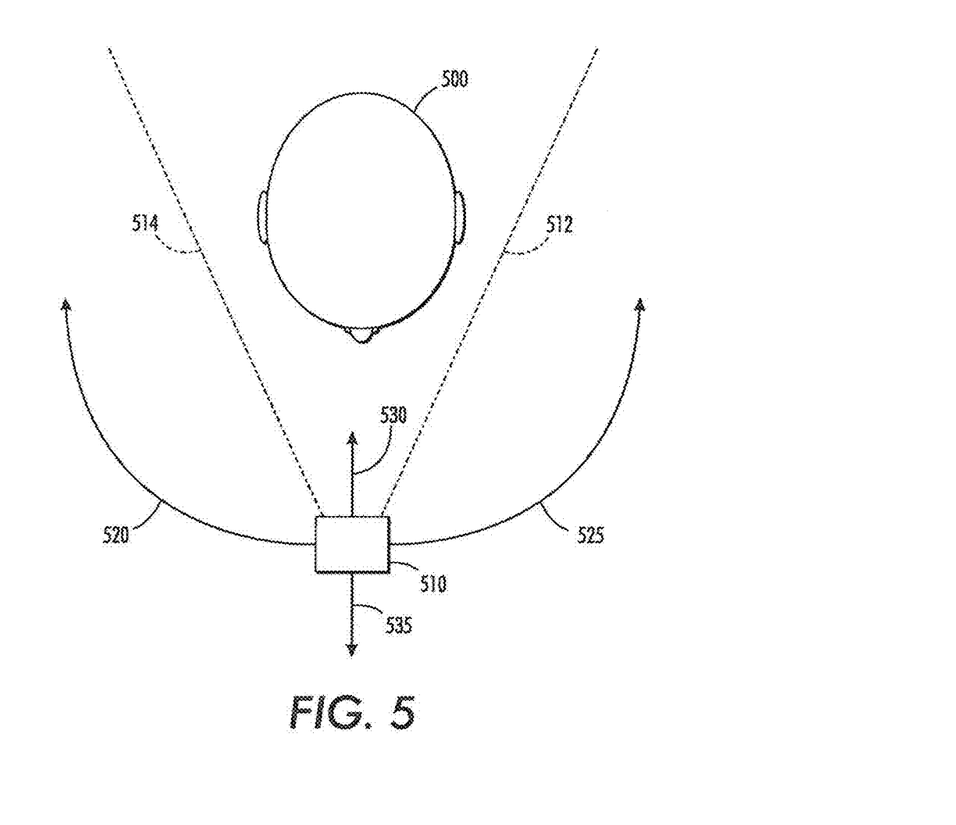
FIG. 5 is a diagram depicting exemplary positions of a video camera and a subject, consistent with certain disclosed embodiments.

FIG. 5 is a diagram depicting exemplary positions of a video camera and a subject, consistent with certain disclosed embodiments. As depicted in FIG. 5, image frames of a face of subject 500 can be captured by video camera 510. The image frames can be used to extract a chew count for subject 500.

In some embodiments, video camera 510 can be positioned in front of the face of subject 500 the image frames captured by video camera 510 can include the area between dotted lines 512 and 514. In further embodiments, video camera 510 can be positioned anywhere in a three-dimensional grid, represented horizontally by lines 520 and 525 and vertically by lines 530 and 535, where the image frames captured by video camera 510 include a facial features of subject 500. Accordingly, video camera can capture image frames of subject 500 that include front views, profile views, partial front views, partial profile views, and various additional angled views of the face of subject 500. A computing device can extract a chew count from the image frames captured by video camera 510 using techniques as disclosed herein.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method of video-based chew counting, the method comprising:
   receiving a plurality of image frames from a video camera, wherein the plurality of image frames depict a subject that is chewing;
   detecting a plurality of feature points within the plurality of image frames from the video camera;
   identifying a jaw line of the subject that is chewing by identifying one or more feature points associated with the jaw line from the plurality of feature points that are outliers based on one or more of aperiodic motion, quasiperiodic motion, and irregular motion compared to other feature points of the plurality of feature points across the plurality of image frames;
   selecting a plurality of reference feature points from the plurality of feature points, wherein the plurality of reference feature points does not include the one or more feature points associated with the jaw line;
   tracking pixel locations of each of the one or more feature points in each image frame of the plurality of image frames;
   tracking pixel locations of each of the plurality of reference feature points in each image frame of the plurality of image frames;
   averaging the pixel locations of each of the plurality of reference feature points in each image frame to generate an average reference pixel location for each image frame;
   adjusting values of the pixel locations of each of the one or more feature points in each image frame based on the average reference pixel location for the image frame to generate a set of adjusted pixel locations, whereby the adjusting negates one of head motion or camera motion from the plurality of image frames;
   generating, using a processor, a motion signal based on the set of adjusted pixel locations;
   determining a chew count of the subject based on the motion signal;
   generating a second motion signal by isolating feature points of the plurality of feature points with horizontal motion compared to other feature points;
   determining a number of swallows based on the second motion signal; and
   generating an eating metric by combining the chew count with the number of swallows.

2. The method of claim 1, wherein the plurality of feature points are detected using one or more of SIFT, SURF, edge detection, corner detection, Harris Corners, GLOH, and HOG.

3. The method of claim 1, further comprising identifying a location of a face across the plurality of image frames from the video camera, wherein the plurality of feature points are detected from within the face.

4. The method of claim 3, wherein the face is identified across the plurality of image frames using one or more of:
   Viola-Jones object detection;
   Schneiderman and Kanade face detection; and
   Rowley, Baluja, and Kanade face detection.

5. The method of claim 1, further comprising generating a second eating metric by combining the chew count with one or more of an amount of time and a number of intake events.

6. The method of claim 5, wherein the second eating metric is generated by combining the chew count with the number of intake events, wherein the number of intake events is determined by detecting occlusion of at least one feature point.

7. The method of claim 1, wherein the one or more feature points associated with the jaw line are further identified by occurrences of high separation compared to other feature points of the plurality of feature points.

8. The method of claim 1, wherein determining the chew count comprises determining the chew count based on one or more of the peaks of the motion signal and the troughs of the motion signal.

9. The method of claim 1, further comprising generating a filtered motion signal by applying one or more of a smoothing algorithm and a detrending algorithm to the motion signal, wherein the chew count is determined based on the filtered motion signal.

10. A system configured to determine chew counts, the system comprising:
    a processing system comprising one or more processors; and
    a memory system comprising one or more computer-readable media, wherein the one or more computer-readable media contain instructions that, when executed by the processing system, cause the processing system to perform operations comprising:
       receiving a plurality of image frames from a video camera, wherein the plurality of image frames depict a subject that is chewing;
       detecting a plurality of feature points within the plurality of image frames from the video camera;
       identifying a jaw line of the subject that is chewing by identifying one or more feature points associated with the jaw line from the plurality of feature points that are outliers based on one or more of aperiodic motion, quasiperiodic motion, and irregular motion compared to other feature points of the plurality of feature points across the plurality of image frames;
       selecting a plurality of reference feature points from the plurality of feature points, wherein the plurality of reference feature points does not include the one or more feature points associated with the jaw line;
       tracking pixel locations of each of the one or more feature points in each image frame of the plurality of image frames;
       tracking pixel locations of each of the plurality of reference feature points in each image frame of the plurality of image frames;
       averaging the pixel locations of each of the plurality of reference feature points in each image frame to generate an average reference pixel location for each image frame;
       adjusting values of the pixel locations of each of the one or more feature points in each image frame based on the average reference pixel location for the image frame to generate a set of adjusted pixel locations, whereby the adjusting negates one of head motion or camera motion from the plurality of image frames;
       generating a motion signal based on the set of adjusted pixel locations;
       determining a chew count of the subject based on the motion signal;
       generating a second motion signal by isolating feature points of the plurality of feature points with horizontal motion compared to other feature points;
       determining a number of swallows based on the second motion signal; and
       generating an eating metric by combining the chew count with the number of swallows.

11. The system of claim 10, wherein the plurality of feature points are detected using one or more of SIFT, SURF, edge detection, corner detection, Harris Corners, GLOH, and HOG.

12. The system of claim 10, the operations further comprising identifying a location of a face across the plurality of image frames from the video camera, wherein the plurality of feature points are detected from within the face.

13. The system of claim 12, wherein the face is identified across the plurality of image frames using one or more of:
   Viola-Jones object detection;
   Schneiderman and Kanade face detection; and
   Rowley, Baluja, and Kanade face detection.

14. The system of claim 10, the operations further comprising generating a second eating metric by combining the chew count with one or more of an amount of time and a number of intake events.

15. The system of claim 14, wherein the second eating metric is generated by combining the chew count with the number of intake events, wherein the number of intake events is determined by detecting occlusion of at least one feature point.

16. The system of claim 10, wherein the one or more feature points associated with the jaw line are further identified by occurrences of high separation compared to other feature points of the plurality of feature points.

17. The system of claim 10, wherein determining the chew count comprises determining the chew count based on one or more of the peaks of the motion signal and the troughs of the motion signal.

18. The system of claim 10, the operations further comprising generating a filtered motion signal by applying one or more of a smoothing algorithm and a detrending algorithm to the motion signal, wherein the chew count is determined based on the filtered motion signal.

* * * * *